US009003388B2

(12) United States Patent
Han et al.

(10) Patent No.: US 9,003,388 B2
(45) Date of Patent: Apr. 7, 2015

(54) INFORMATION PROCESSING APPARATUS AND UPDATE PROCESS SUPPORT SYSTEM

(75) Inventors: Xiaofeng Han, Kanagawa (JP); Yuuko Sugiura, Tokyo (JP); Tomoya Hirokawa, Kanagawa (JP); Taku Ikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 81 days.

(21) Appl. No.: 13/816,754

(22) PCT Filed: Aug. 8, 2011

(86) PCT No.: PCT/JP2011/068485
§ 371 (c)(1),
(2), (4) Date: Feb. 13, 2013

(87) PCT Pub. No.: WO2012/023528
PCT Pub. Date: Feb. 23, 2012

(65) Prior Publication Data
US 2013/0145141 A1  Jun. 6, 2013

(30) Foreign Application Priority Data
Aug. 18, 2010  (JP) .................................. 2010-182850

(51) Int. Cl.
*G06F 9/44*  (2006.01)
*G06F 9/445*  (2006.01)

(52) U.S. Cl.
CPC .... *G06F 8/65* (2013.01); *G06F 8/61* (2013.01)

(58) Field of Classification Search
None
See application file for complete search history.

(56) References Cited

U.S. PATENT DOCUMENTS

| 7,818,736 | B2 * | 10/2010 | Appavoo et al. ............... 717/168 |
| 7,865,890 | B2 * | 1/2011 | Sumi et al. .................... 717/169 |
| 8,522,229 | B2 * | 8/2013 | Ando et al. .................... 717/168 |
| 2003/0154323 | A1 * | 8/2003 | Kujirai .......................... 709/327 |

(Continued)

FOREIGN PATENT DOCUMENTS

| JP | H11-167484 | 6/1999 |
| JP | 2001-134428 | 5/2001 |

(Continued)

OTHER PUBLICATIONS

Bock, Heiko, Auto Update Services API, 2012, pp. 279-285.*

(Continued)

*Primary Examiner* — Thuy Dao
*Assistant Examiner* — Christopher Franco
(74) *Attorney, Agent, or Firm* — IPUSA, PLLC

(57) ABSTRACT

An information processing apparatus includes a storage unit that stores reboot necessity information for respective versions of programs that are install targets of an electronic device, the reboot necessity information indicating whether the electronic device needs to be rebooted when a first program of a first version installed in the electronic device is updated to a second program of a second version; an extracting unit that extracts difference information indicating a difference between the first program and the second program in response to a request to acquire the second program, the request specifying the first version of the first program; a determining unit that determines whether the electronic device needs to be rebooted when the second program is installed, based on the difference between the first version and the second version indicated in the difference information and the reboot necessity information; and a responding unit that returns a determination result.

8 Claims, 11 Drawing Sheets

(56) References Cited

U.S. PATENT DOCUMENTS

| | | | |
|---|---|---|---|
| 2004/0073901 A1* | 4/2004 | Imamatsu | 717/170 |
| 2005/0086654 A1 | 4/2005 | Sumi et al. | |
| 2007/0047017 A1 | 3/2007 | Ando et al. | |
| 2008/0059960 A1* | 3/2008 | Akiyoshi | 717/170 |
| 2008/0263347 A1* | 10/2008 | Chen | 713/2 |
| 2008/0263540 A1* | 10/2008 | Bando et al. | 717/173 |
| 2010/0058321 A1* | 3/2010 | Anderson et al. | 717/173 |
| 2010/0058482 A1 | 3/2010 | Nagumo et al. | |
| 2010/0071069 A1 | 3/2010 | Sugiura et al. | |
| 2011/0041125 A1 | 2/2011 | Sugiura | |
| 2011/0055825 A1 | 3/2011 | Ikawa et al. | |
| 2011/0066886 A1 | 3/2011 | Sugiura et al. | |
| 2011/0066972 A1 | 3/2011 | Sugiura | |
| 2011/0067117 A1 | 3/2011 | Nagumo et al. | |
| 2011/0154313 A1* | 6/2011 | Nolterieke et al. | 717/170 |

FOREIGN PATENT DOCUMENTS

| | | |
|---|---|---|
| JP | 2003-084982 | 3/2003 |
| JP | 2003-308215 | 10/2003 |
| JP | 2005-056319 | 3/2005 |
| JP | 2005-115920 | 4/2005 |
| JP | 2005-165535 | 6/2005 |
| JP | 2005-276013 | 10/2005 |
| JP | 2007-089139 | 4/2007 |
| JP | 2008-084304 | 4/2008 |
| JP | 2010-176517 | 8/2010 |
| JP | 2011-039875 | 2/2011 |
| JP | 2011-054044 | 3/2011 |
| JP | 2011-060143 | 3/2011 |
| JP | 2011-060144 | 3/2011 |
| JP | 2011-060237 | 3/2011 |
| JP | 2011-060241 | 3/2011 |

OTHER PUBLICATIONS

Swift, Michael M., et al., Live Update of Device Drivers, 2008, pp. 1-11.*
Chang, Yao-Chung, et al., Dynamic Software Update Model for Remote Entity Management of Machine-to-Machine Service Capability, 2012, pp. 32-39.*
Sharma, Rajeev Kr., et al., The Role of Automatic Dynamic Update to Improve an Operating System Availability, 2011, pp. 355-360.*
Makris, Kristis, et al., Dynamic and Adaptive Updates of Non-Quiescent Subsystems in Commodity Operating System Kernels, 2007, pp. 327-340.*
Seifzadeh, Habib, et al., A Method for Dynamic Software Updating in Real-Time Systems, 2009, pp. 34-38.*
International Search Report Issued Sep. 27, 2011 in PCT/JP2011/068485 filed on Aug. 8, 2011.
Windows: "Installing Drivers and Utilities without Rebooting on Windows—Version 1.0a", Internet Citation, Dec. 4, 2001, XP007902317, Retrieved from the Internet: URL: http://www.microsoft.com/whdc/system/pnppwr/pnp/no_reboot.mspx [retrieved on May 14, 2007].
Extended European search report dated Jul. 8, 2014.
Korean Office Action dated Jul. 8, 2014.

* cited by examiner

FIG.6

| PRODUCT ID | VERSION | FILE NAME | ... |
|---|---|---|---|
| 1021 | 1.2 | aaa.jar | ... |
| 1022 | 1.2 | bbb.jar | ... |
| 1023 | 1.3 | ccc.jar | ... |
| 1025 | 1.5 | eee.jar | ... |
| : | : | : | : |

FIG.7

```
<reboot>true</reboot>
```

| PRODUCT ID | PRESENT VERSION | NEW VERSION | FILE NAME | ... |
|---|---|---|---|---|
| 1022 | 1.2 | 1.5 | bbb.jar | ... |
| 1024 | — | 1.2 | ddd.jar | ... |

| VERSION | 1021<br>(aaa.jar) | 1022<br>(bbb.jar) | 1023<br>(ccc.jar) | 1024<br>(ddd.jar) | ... |
|---------|---------|---------|---------|---------|-----|
| 1.0 | 1 | 1 | 0 | 1 | ... |
| 1.1 | 0 | 0 | 0 | 0 | ... |
| 1.2 | 1 | 1 | 1 | 0 | ... |
| 1.4 | 0 | 1 | 1 | 1 | ... |
| 1.5 | 0 | 0 | 1 | 0 | ... |
| : | : | : | : | : | : |

INFORMATION PROCESSING APPARATUS AND UPDATE PROCESS SUPPORT SYSTEM

TECHNICAL FIELD

The present invention relates to an information processing apparatus and an update process support system, and more particularly to an information processing apparatus and an update process support system for supporting an update process of a program.

BACKGROUND ART

In recent years, image forming apparatuses such as printers, copiers, scanners, fax machines, and multifunction peripherals that implement these functions in a single casing, have a CPU similar to that of general-purpose computers, and various functions are implemented by controlling applications, although the restrictions on memories are rigid (see, for example, patent document 1).

There are some examples of image forming apparatuses that are provided with a platform for implementing and executing applications. After shipment, applications that are appropriate for the user's usage environment may be created and installed, to enhance the functions.

Meanwhile, applications are generally upgraded for the purpose of correcting bugs and expanding functions. When upgrading an application, the image forming apparatus in which the application is installed executes a process of updating the application. After executing the update process, the image forming apparatus is rebooted to activate the updated contents.

However, in practical situations, the image forming apparatus may not always need to be rebooted for all update processes. If the update only involves a slight change, the image forming apparatus may not need to be rebooted.

In particular, an image forming apparatus in which applications can be installed is typically shared by plural users in an office. If such an image forming apparatus is rebooted, the business operations of the users may be significantly affected. Thus, the frequency of rebooting an image forming apparatus is preferably minimized.

Patent Document 1: Japanese Laid-Open Patent Application No. 2008-084304

DISCLOSURE OF INVENTION

The present invention has been made in view of the above-described problems, and it is an object of at least one embodiment of the present invention to provide an information processing apparatus and an update process support system capable of enhancing the efficiency of processes of updating programs.

An aspect of the present invention provides an information processing apparatus including a reboot necessity information storage unit configured to store reboot necessity information for respective versions of at least one program that is an install target of an electronic device, the reboot necessity information indicating whether the electronic device needs to be rebooted when a first program corresponding to a first version installed in the electronic device is updated to a second program corresponding to a second version; a difference extracting unit configured to extract difference information of the second program indicating a difference between the first program and the second program in response to a request to acquire the second program, the request specifying the first version of the first program installed in the electronic device; a determining unit configured to determine whether the electronic device needs to be rebooted when the second program is installed, based on the difference between the first version of the first program and the second version of the second program indicated in the difference information and also based on the reboot necessity information; and a responding unit configured to return a determination result obtained by the determining unit.

An aspect of the present invention provides a non-transitory computer-readable storage medium with an executable program stored therein, wherein the program instructs a processor of a computer to execute a method including extracting difference information indicating a difference between a first program corresponding to a first version installed in an electronic device and a second program corresponding to a second version in response to a request to acquire the second program, the request specifying the first version of the first program; determining whether the electronic device needs to be rebooted when the second program is installed, based on the difference between the first version of the first program and the second version of the second program indicated in the difference information and also based on reboot necessity information stored in a reboot necessity information storage unit for respective versions of at least one program that is an install target of the electronic device, the reboot necessity information indicating whether the electronic device needs to be rebooted when the first program corresponding to the first version installed in the electronic device is updated to the second program corresponding to the second version; and returning a determination result obtained at the determining.

An aspect of the present invention provides an update process support system including an information processing apparatus including a reboot necessity information storage unit configured to store reboot necessity information for respective versions of at least one program that is an install target of an electronic device, the reboot necessity information indicating whether the electronic device needs to be rebooted when a first program corresponding to a first version installed in the electronic device is updated to a second program corresponding to a second version, a difference extracting unit configured to extract difference information of the second program indicating a difference between the first program and the second program in response to a request to acquire the second program, the request specifying the first version of the first program installed in the electronic device, a determining unit configured to determine whether the electronic device needs to be rebooted when the second program is installed, based on the difference between the first version of the first program and the second version of the second program indicated in the difference information and also based on the reboot necessity information, and a responding unit configured to return a determination result obtained by the determining unit, the update process support system further including an update control unit configured not to reboot the electronic device after the first program is updated to the second program, when the determination result returned from the information processing apparatus does not request the electronic device to be rebooted.

BRIEF DESCRIPTION OF DRAWINGS

FIG. 6 illustrates an example of install information;

FIG. 7 illustrates an example of a determination result of whether reboot is necessary;

BEST MODE FOR CARRYING OUT THE INVENTION

Embodiments of the present invention are described below with reference to the accompanying drawings.

Figure 1:
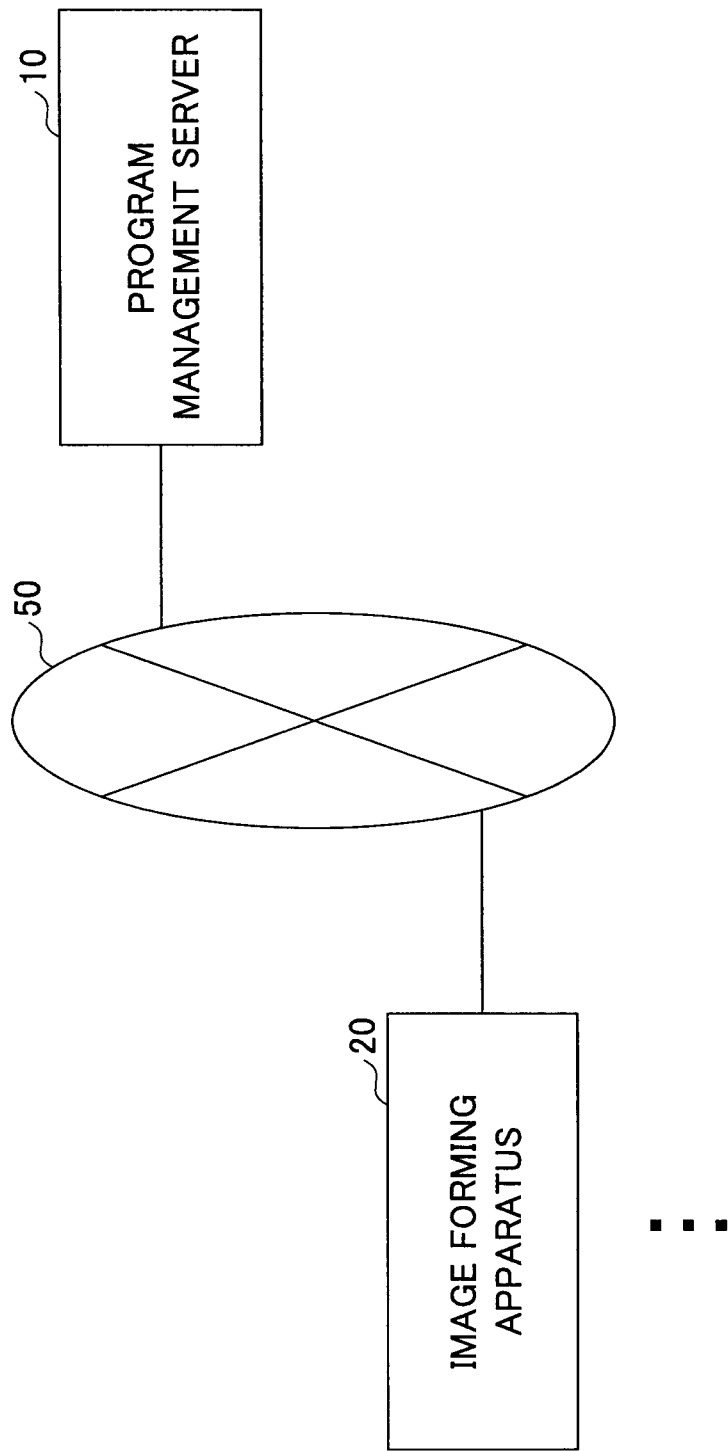
FIG. 1 illustrates an example of a system according to a first embodiment of the present invention.

FIG. 1 illustrates an example of a system according to a first embodiment of the present invention. As illustrated in FIG. 1, one or more image forming apparatuses 20 and a program management server 10 are connected to each other via a network 50 (wired or wireless) such as LAN (Local Area Network) or the Internet, in a manner that communications can be performed.

The image forming apparatus 20 is an example of an electronic device, such as a multifunction peripheral, a copier, a printer, or a fax machine. The image forming apparatus 20 may be any other electronic device as long as programs can be installed and updated in the image forming apparatus 20.

The program management server 10 is a computer (information processing apparatus) for managing programs installed in the image forming apparatus 20. For example, in response to a program acquisition request from the image forming apparatus 20, the program management server 10 returns a response including the requested program to the image forming apparatus 20.

Figure 2:
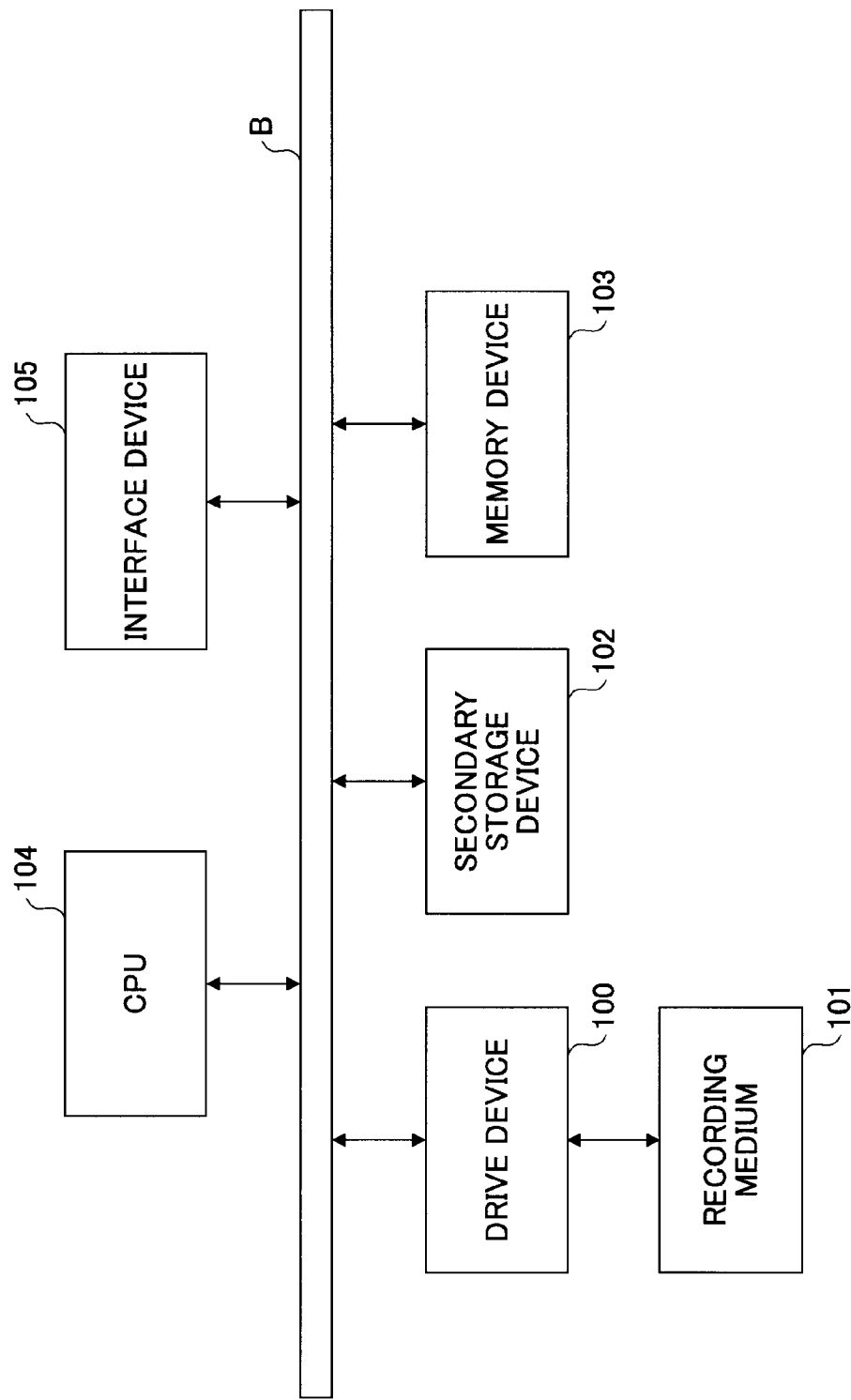
FIG. 2 illustrates an example of a hardware configuration of a program management server according to an embodiment of the present invention.

FIG. 2 illustrates an example of a hardware configuration of the program management server 10 according to an embodiment of the present invention. The program management server 10 illustrated in FIG. 2 includes a drive device 100, a secondary storage device 102, a memory device 103, a CPU 104, and an interface device 105, which are interconnected by a bus B.

Programs for implementing processes at the program management server 10 are provided by a recording medium 101 such as a CD-ROM. When the recording medium 101 having a program recorded therein is set in the drive device 100, the program is installed in the secondary storage device 102 from the recording medium 101 via the drive device 100. However, programs may not necessarily be installed from the recording medium 101; programs may be downloaded from other computers via a network. The secondary storage device 102 stores the installed programs as well as necessary files and data.

The memory device 103 reads a program from the secondary storage device 102 and stores the read program, in response to an instruction to activate the program. The CPU 104 executes functions relevant to the program management server 10 according to programs stored in the memory device 103. The interface device 105 is used for connecting to a network.

Figure 3:
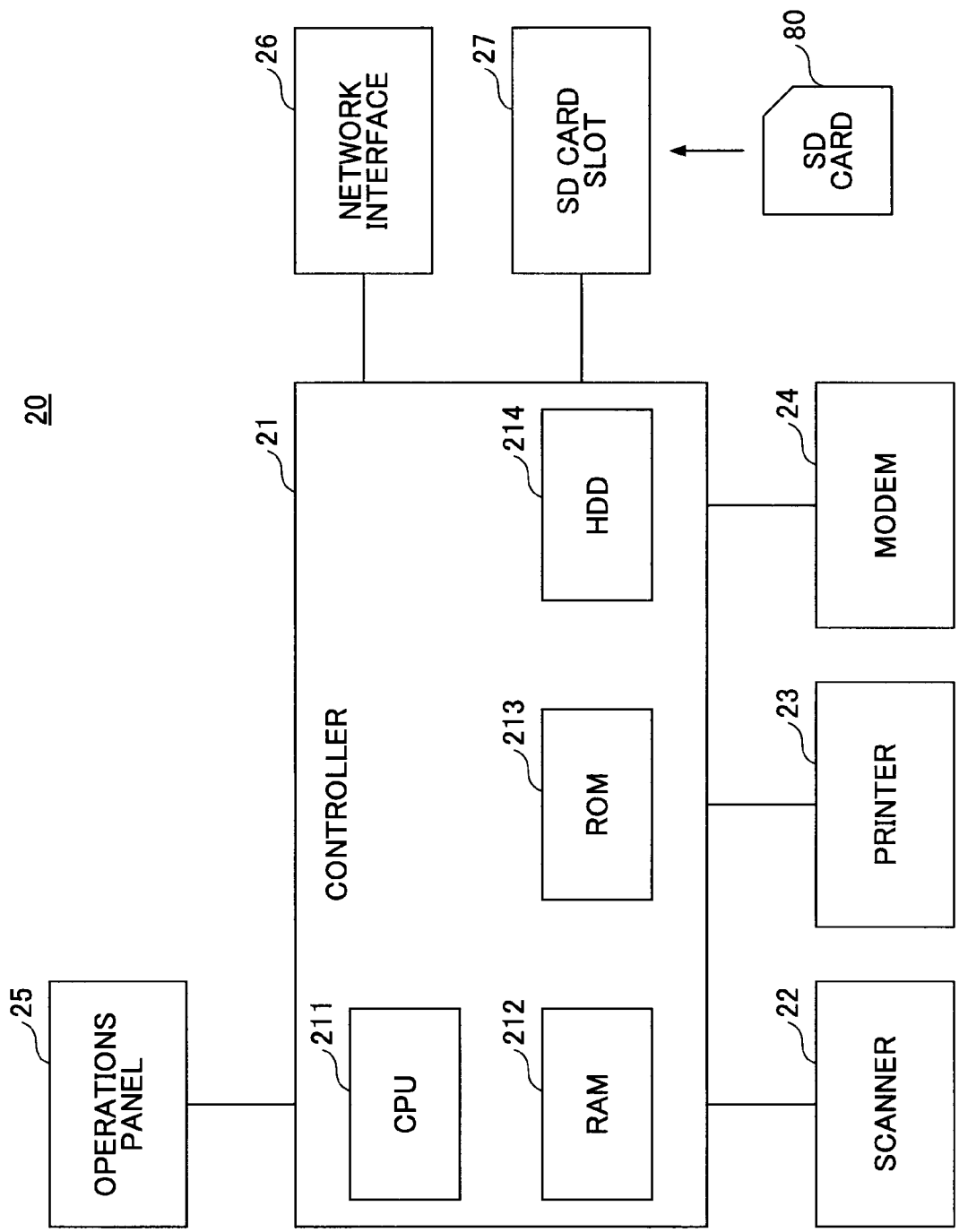
FIG. 3 illustrates an example of a hardware configuration of an image forming apparatus according to an embodiment of the present invention.

FIG. 3 illustrates an example of a hardware configuration of the image forming apparatus 20 according to an embodiment of the present invention. As illustrated in FIG. 3, the image forming apparatus 20 includes hardware elements such as a controller 21, a scanner 22, a printer 23, a modem 24, an operations panel 25, a network interface 26, and an SD card slot 27.

The controller 21 includes a CPU 211, a RAM 212, a ROM 213, and a HDD 214. The ROM 213 records various programs and data used by the programs. The RAM 212 is used as a storage area for loading programs and a work area for the loaded programs. The CPU 211 processes the programs loaded in the RAM 212 to implement various functions. The HDD 214 records programs and various data items used by the programs.

The scanner 22 is a hardware element for scanning an original document to obtain image data. The printer 23 is a hardware element for printing data onto a sheet. The modem 24 is a hardware element for connecting the image forming apparatus 20 to a telephone line to transmit and receive image data by fax communications. The operations panel 25 is a hardware element including an input unit such as a pointer for receiving input from a user, and a display unit such as a liquid crystal panel. The network interface 26 is a hardware element for connecting the image forming apparatus 20 to a network (wired or wireless) such as LAN. The SD card slot 27 is used for reading programs recorded in an SD card 80. In the image forming apparatus 20, in addition to programs recorded in the ROM 213, programs recorded in the SD card 80 may also be loaded and executed in the RAM 212. Other recording media (for example, a CD-ROM and a USB (Universal Serial Bus) memory) may be used instead of the SD card 80. That is to say, the type of recording medium corresponding to the SD card 80 is not particularly limited. The SD card slot 27 may be replaced by a hardware element according to the type of recording medium.

Figure 4:
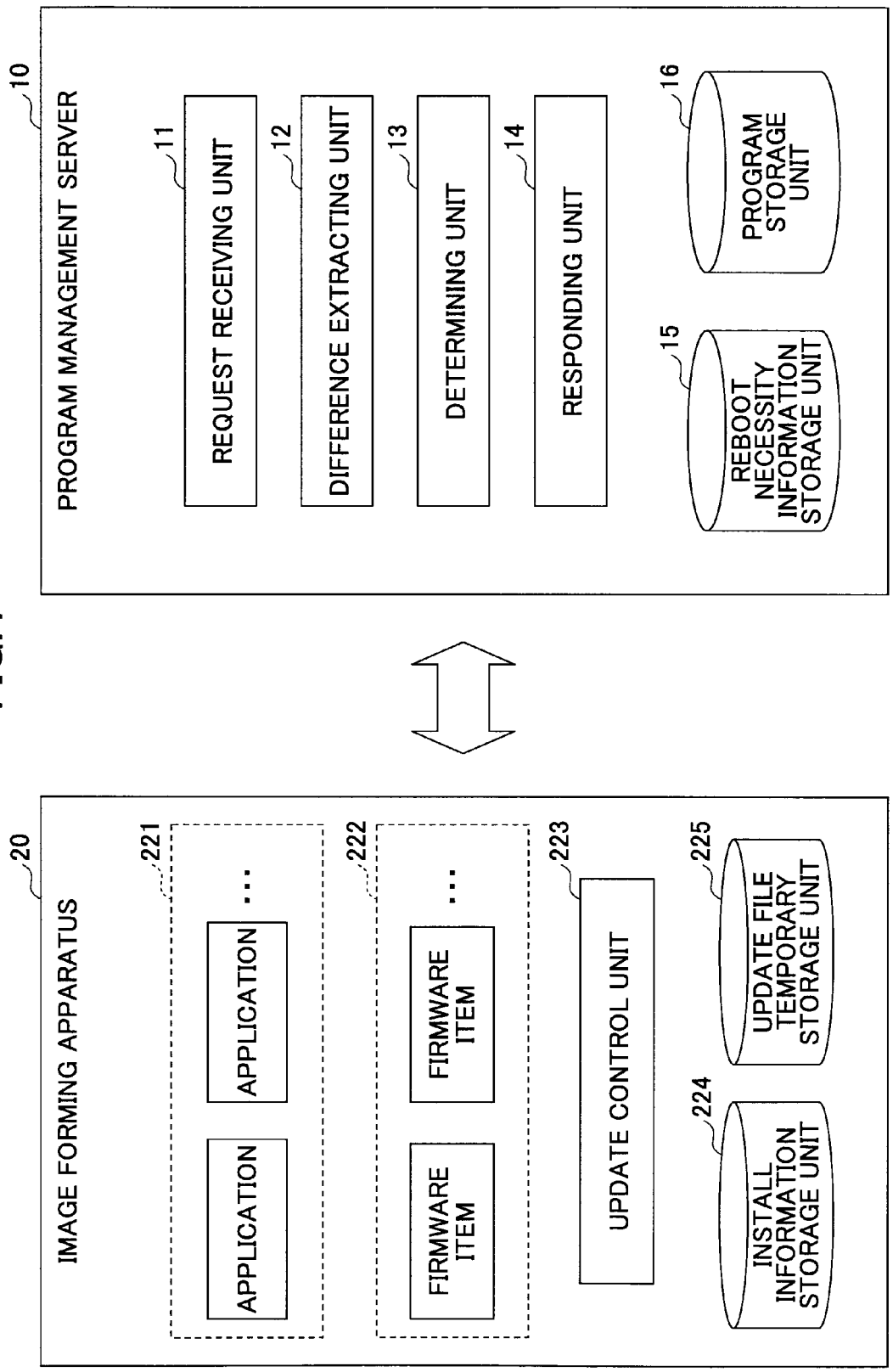
FIG. 4 illustrates an example of a functional block diagram of the image forming apparatus and the program management server according to the first embodiment of the present invention.

FIG. 4 illustrates an example of a functional block diagram of the image forming apparatus 20 and the program management server 10 according to the first embodiment of the present invention.

As illustrated in FIG. 4, the image forming apparatus 20 includes one or more applications 221, one or more firmware items 222, an update control unit 223, an install information storage unit 224, and an update file temporary storage unit 225. The applications 221 are programs for causing the image forming apparatus 20 to execute jobs according to instructions input via the operations panel 25. The firmware items 222 are programs for causing the image forming apparatus 20 to execute functions that are more primitive or of lower levels than the applications 221. Each application 221 or each firmware item 222 may be an assembly (program assembly) of programs (program components) including one more program components (program files). A program component is a software element that is typically referred to as a program module. However, a program (for example, an EXE file) that is executable as a single body is also included in the concept of a program component according to the present embodiment. Examples of program components are JAR (Java (trademark registered) Archive) files and attribute files in which attribute information relevant to the application 221 and the firmware item 222 is described. However, the implementation of a program component is not particularly limited. A program component may be a relative concept. For example, JAR includes one or more class files. Accordingly, from the viewpoint of a JAR file, a class file is a program component. Thus, a program component is not necessarily a unit that cannot be further segmentalized; a program component may have a hierarchical structure. That is to say, a program component may include a program component of a lower level.

In the present embodiment, a program assembly is a distribution unit. Specifically, programs may be installed, uninstalled, or updated (upgraded) in units of the applications 221 and firmware items 222. However, the program components included in the program assembly may be separately modified (upgraded). Therefore, the program components belonging to the same application 221 or firmware item 222 may be of different versions (version numbers). The version numbers of the program components may be of different systems (expressions). As a program component is upgraded, the version of the program assembly including the upgraded program component is also updated (upgraded).

The update control unit 223 controls the update process (or replacement process) of the applications 221 or firmware items 222 in the image forming apparatus 20. An update process is to replace an old version with a new version (however, an update in the opposite direction may be performed). In the present embodiment, it is assumed that the update process is an embodiment of an installing process. That is to say, an update process is included in the concept of an installing process.

The update control unit 223 is a virtual unit implemented as a program installed in the image forming apparatus 20 that causes the CPU 211 of the image forming apparatus 20 to execute a process.

The install information storage unit 224 stores attribute information of program components installed in the image forming apparatus 20, by using the HDD 214. That is to say, the attribute information is not managed in units of program assemblies such as the applications 221 and firmware items 222, but in units of program components. The same program component may be shared by the application 221 and the firmware item 222. This is to avoid a case of redundantly managing attribute information relevant to the same program component. However, there may be separate attribute information items for the respective applications 221 and firmware items 222, and separate attribute information items for the program components belonging to the respective applications 221 and firmware items 222, stored by the install information storage unit 224. The attribute information includes a product ID and a version of the application 221, the firmware item 222, or the program component (hereinafter, these items may be collectively referred to as a "program" when these items are not particularly distinguished from one another). A product ID is identification information for indicating the type of program. That is to say, the product ID is not different for each program entity; the same product ID is applied to programs if the programs are of the same type.

The update file temporary storage unit 225 temporarily stores an update file downloaded from the program management server 10, by using the HDD 214. An update file is a file (for example, an archive file) including a program component of the application 221 or firmware item 222 that is an update target. However, an update file may not be formed as a single file. An update file may be an assembly of files corresponding to plural program components.

The program management server 10 includes a request receiving unit 11, a difference extracting unit 12, a determining unit 13, a responding unit 14, a reboot necessity information storage unit 15, and a program storage unit 16.

The request receiving unit 11 receives, from the image forming apparatus 20, a request to acquire the application 221 or firmware item 222 that is an update target. The acquisition request includes the product ID and the version of the application 221 or firmware item 222 that is the acquisition target, and a list of attribute information items of program components installed in the image forming apparatus 20.

The difference extracting unit 12 extracts difference information of a program component included in the program assembly that is the acquisition target, with respect to a program component installed in the image forming apparatus 20. The difference information includes, for example, the program ID and version of a program component included in a program assembly that is an acquisition target, but that is not installed in the image forming apparatus 20. Furthermore, if the version of a program component already installed in the image forming apparatus 20 is different from that of the program component included in the program assembly that is the acquisition target, the program ID and the two different versions of the corresponding program component are also included in the difference information. The two different versions means the version installed in the image forming apparatus 20 and the version included in the program assembly that is the acquisition target.

The determining unit 13 determines whether it is necessary to reboot the image forming apparatus 20 after the update process (after the installing process) of the program assembly that is the acquisition target, based on the difference information and the reboot necessity information storage unit 15.

The determining unit 13 returns the determination result of the determining unit 13 and the program assembly that is the acquisition target, to the image forming apparatus 20.

The reboot necessity information storage unit 15 stores, by using the secondary storage device 102, information indicating whether it is necessary to reboot the image forming apparatus 20 when updating the version from a past version, for the respective versions of program components.

The program storage unit 16 stores, by using the secondary storage device 102, the entity (file) of the application 221 or firmware item 222 that has been packaged (for example, archived). However, the entity may be managed in a state where the entity is broken down into separate program components. In this case, a package (program assembly) of the application 221 or firmware item 222 is to be dynamically created according to the application 221 or firmware item 222 that is the download target.

The following describes processing procedures of the image forming apparatus 20 and the program management server 10. In the following, the program assembly that is an update target is described as the application 221, as a matter of convenience. However, the same processing procedures are basically applicable to a case where the firmware item 222 is the update target.

Figure 5:
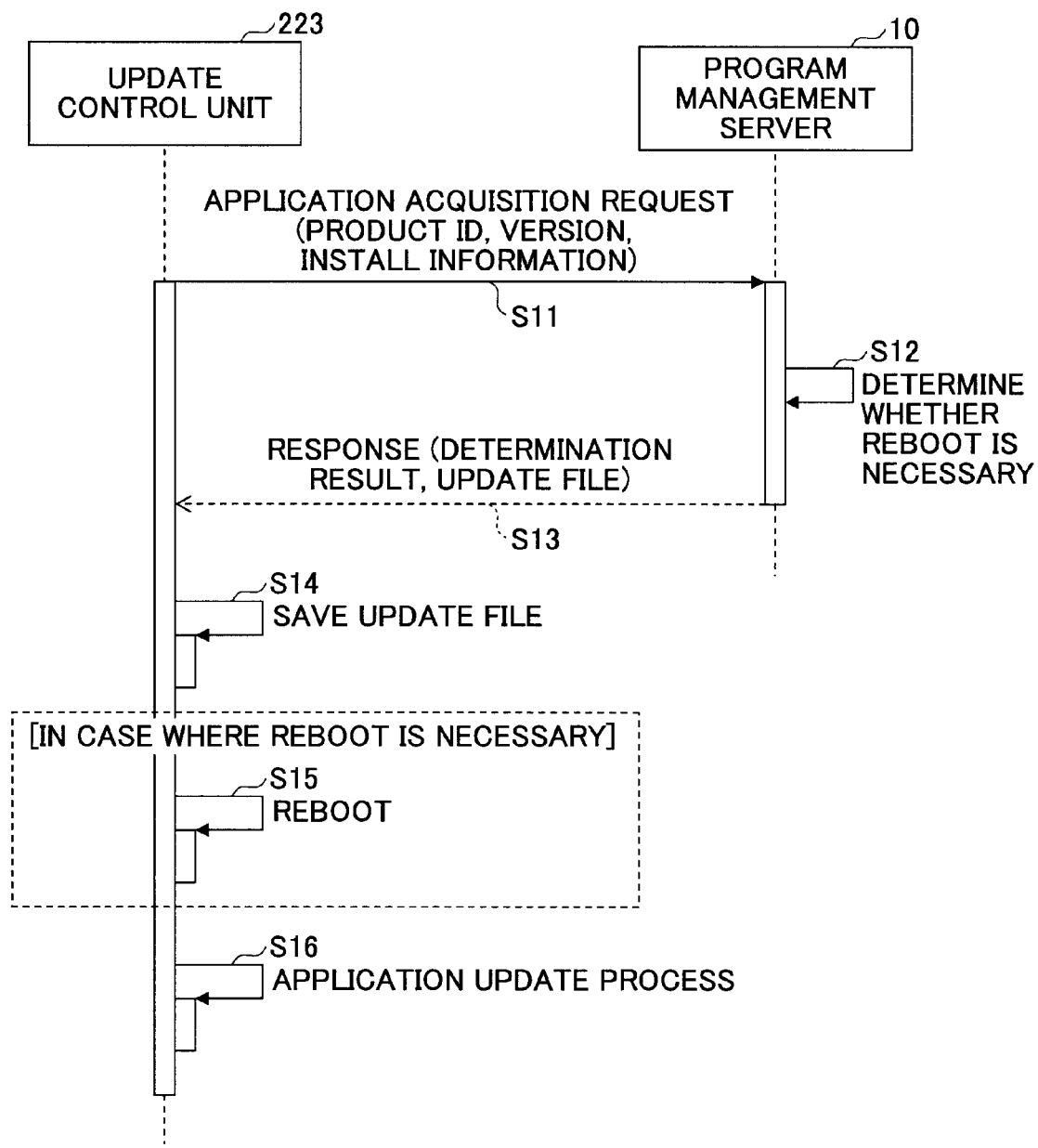
FIG. 5 is a sequence diagram for describing the processing procedures of a process for updating an application in the image forming apparatus according to the first embodiment of the present invention.

FIG. 5 is a sequence diagram for describing the processing procedures of a process for updating an application 221 in the image forming apparatus 20 according to the first embodiment of the present invention. In executing the processing procedures of FIG. 5, it is assumed that the user has selected the application 221 that is an update target, via the operations panel 25.

In step S11, the update control unit 223 of the image forming apparatus 20 specifies the product ID and version of the application 221 selected as the update target, and transmits a request to acquire the application 221 to the program management server 10. When a version is not specified, it may be assumed that a predetermined version is specified, such as the latest version. Furthermore, the acquisition request also includes a list of attribute information items (hereinafter, "install information") of program components that have been installed in the image forming apparatus 20, which is recorded in the install information storage unit 224.

FIG. 6 illustrates an example of the install information. As illustrated in FIG. 6, the install information includes attribute information such as a product ID, the version, and a file name, stored for each program component installed in the image forming apparatus 20. The file name is not mandatory, because each program component can be identified by the product ID. However, when the program components are to be identified by file names, product IDs are not mandatory.

When the application 221 that is the acquisition target includes plural program components, the acquisition request corresponds to an acquisition request for plural programs (plural program components).

The acquisition request is received by the request receiving unit 11 of the program management server 10. The program management server 10 determines whether the image forming apparatus 20 is to be rebooted, when the application 221 specified as an acquisition target in the acquisition request is updated (installed) in the image forming apparatus 20 (step S12). Next, the determining unit 13 of the program management server 10 returns, to the update control unit 223, an update file including the application 221 specified as the acquisition target and the determination result of whether reboot is necessary (step S13). The application 221 is acquired from the program storage unit 16, based on the program ID and version specified in the acquisition request. That is to say, in the program storage unit 16, the applications 221 and firmware items 222 are recorded in association with product IDs and versions.

When a response is received from the program management server 10, the update control unit 223 saves the update file included in the response in the update file temporary storage unit 225 (step S14).

Next, the update control unit 223 determines whether to reboot the image forming apparatus 20 based on the determination result of whether reboot is necessary included in the response from the program management server 10.

FIG. 7 illustrates an example of a determination result of whether reboot is necessary. FIG. 7 illustrates an example in which the determination result is expressed in an XML (eXtensible Markup Language). That is to say, the determination result is indicated as a value of a reboot element. In the determination result, "true" means that reboot is necessary, and "false" means reboot is unnecessary. The determination result may be expressed in a format other than XML.

When the determination result included in the response from the program management server 10 indicates that reboot is necessary (when reboot is requested), the update control unit 223 causes the operations panel 25 to display a screen image for inquiring whether reboot is allowed (hereinafter, "reboot confirmation screen image"). In the reboot confirmation screen image, when rejection of reboot is selected, the update control unit 223 ends the process of FIG. 5. In this case the reboot and the process of updating the application 221 are not executed. Therefore, the user continues using the not-updated version of the application 221 corresponding to the update target. That is to say, the user can reject the reboot when the timing is not appropriate for the reboot, based on the usage status of the image forming apparatus 20. Accordingly, the user can continue business operations using the image forming apparatus 20 without being forced to discontinue the usage of the image forming apparatus 20.

When the user selects to allow reboot in the reboot confirmation screen image, the update control unit 223 reboots the image forming apparatus 20 (step S15).

In the process of rebooting the image forming apparatus 20, the update control unit 223 confirms whether an update file is saved in the update file temporary storage unit 225. When an update file is saved, the update control unit 223 executes an update process on the application 221 included in the update file (step S16). When the update process is successful, the update control unit 223 deletes the update file from the update file temporary storage unit 225. That is to say, an update file being saved in the update file temporary storage unit 225 means that the application 221 needs to be updated based on the saved update file, when rebooting the image forming apparatus 20. Thus, even when the user has selected to reject reboot in the reboot confirmation screen image, the next time the image forming apparatus 20 is rebooted, the update control unit 223 executes an update process on the application 221 according to the update file saved in the update file temporary storage unit 225.

Meanwhile, when the determination result included in the response from the program management server 10 indicates that reboot is unnecessary (when reboot is not requested), the update control unit 223 executes an update process without displaying the reboot confirmation screen image (step S16). However, a screen image for inquiring whether to immediately start the update process (hereinafter, "update confirmation screen image") may be displayed on the operations panel 25. When the user selects to allow the start of the update process in the update confirmation screen image, the update control unit 223 immediately executes the update process. When the user selects to reject the start of the update process in the update confirmation screen image, the update control unit 223 does not start the update process and ends the process of FIG. 5. Thus, the user continues using the not-updated version of the application 221 corresponding to the update target. Even when the user has selected to reject the start of the update process, the next time the image forming apparatus 20 is rebooted, the update control unit 223 automatically executes the update process.

Next, a detailed description is given of the process executed by the program management server 10 in step S12.

Figure 8:
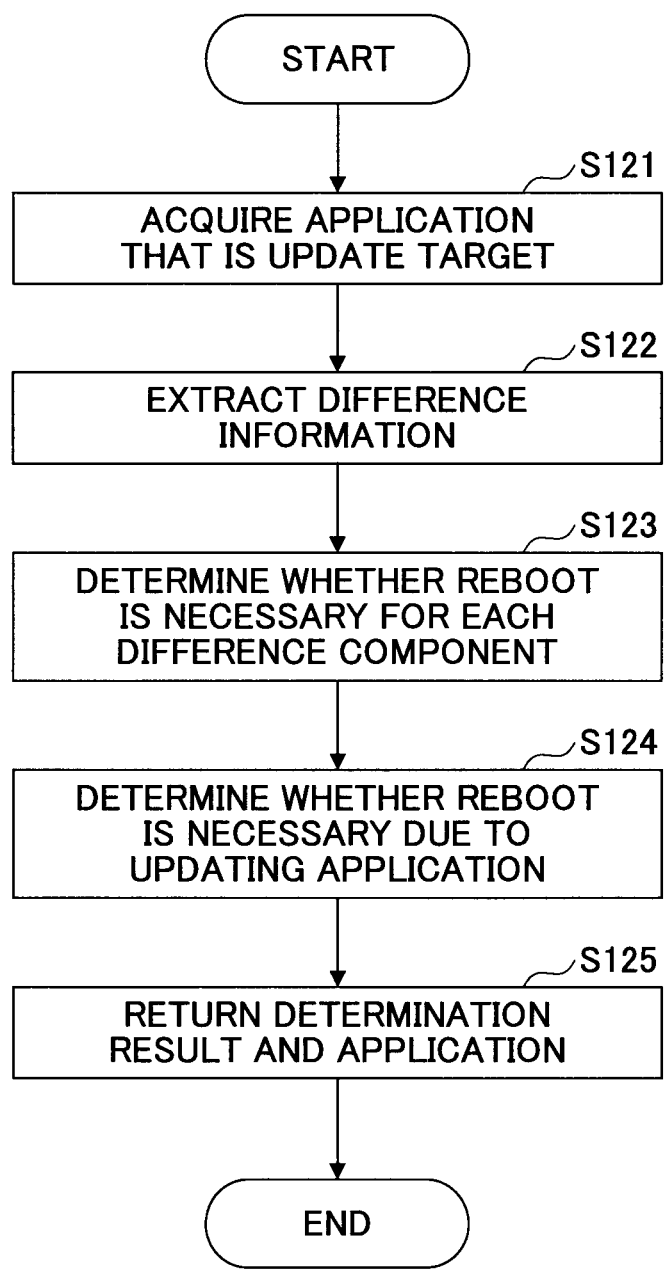
FIG. 8 is a flowchart for describing the processing procedures of the process of determining whether reboot is necessary, performed by the program management server.

FIG. 8 is a flowchart for describing the processing procedures of the process of determining whether reboot is necessary, performed by the program management server 10.

In step S121, the difference extracting unit 12 acquires, from the program storage unit 16, the application 221 corresponding to the product ID and version specified in the acquisition request. In the present embodiment, it is assumed that an application 221a as illustrated in FIG. 9 is the acquisition target.

Figures 9, 10:
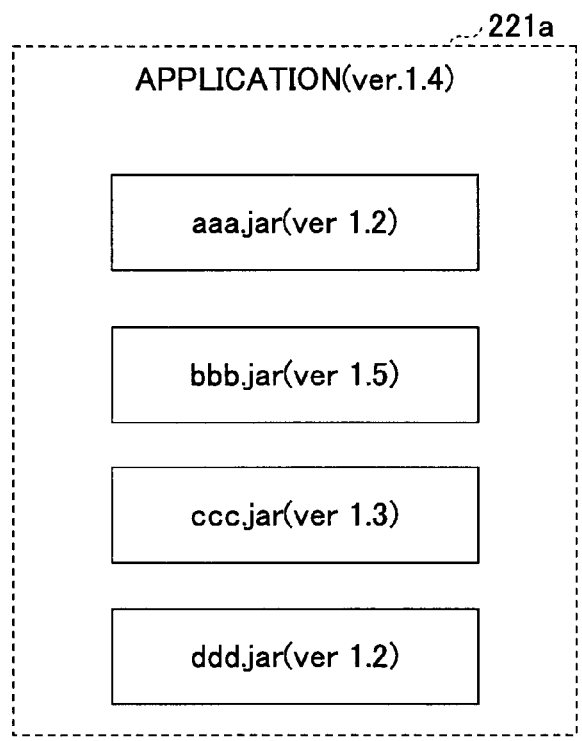
FIG. 9 illustrates an example of a configuration of an application that is an acquisition target.
FIG. 10 illustrates an example of difference information.

FIG. 9 illustrates an example of a configuration of an application that is an acquisition target. As illustrated in FIG. 9, the application 221a includes program components such as aaa-.jar, bbb.jar, ccc.jar, and ddd.jar. The numbers in parenthesis indicate the corresponding versions. The versions may be described in attribute files accompanying the respective program components, or may be included as a part of each file name. Product IDs are assigned to the application 221*a* and the program components, but are not illustrated in FIG. 9 as a matter of convenience.

It may be confirmed that the application 221*a* has a configuration as illustrated in FIG. 9 by opening an archive file of the application 221*a*, or by referring to configuration information as illustrated in FIG. 9 that is recorded in the secondary storage device 102 for each application 221*a*.

Next, the difference extracting unit 12 extracts difference information indicating the difference between the install information and the program components included in the application 221*a* (step S122).

FIG. 10 illustrates an example of difference information. As illustrated in FIG. 10, the difference information includes the program IDs, the present versions, the new versions, and the file names for program components included in the application 221*a*, for indicating the differences between the application 221*a* and the program components already installed in the image forming apparatus 20.

The present version is the version already installed in the image forming apparatus 20 (i.e., the version included in the install information). As to the program components not installed in the image forming apparatus 20, the value of the present version is not shown (indicated by "-" in FIG. 10). The new version is the version included in the application 221*a*.

The difference information illustrated in FIG. 10 is relevant to the application 221*a* (FIG. 9) corresponding to install information of FIG. 6. Comparing FIG. 9 with FIG. 6, the versions of "aaa.jar" and "ccc.jar" are the same and there are no differences. Meanwhile, as for "bbb.jar", the versions in FIGS. 9 and 6 are different. Specifically, the version in the install information is "1.2", whereas the version included in the application 221*a* is "1.5". Furthermore, "ddd.jar" is not included in the install information (i.e., not installed in the image forming apparatus 20). Therefore, the differences regarding "bbb.jar" and "ddd.jar" are extracted as program components having differences ("difference components"), and information relevant to the difference components are extracted as difference information as illustrated in FIG. 10.

Next, the determining unit 13 uses the extracted difference information and the reboot necessity information storage unit 15 to determine the necessity of rebooting the image forming apparatus 20 due to an update process, for each difference component (step S123).

Figures 11, 12:
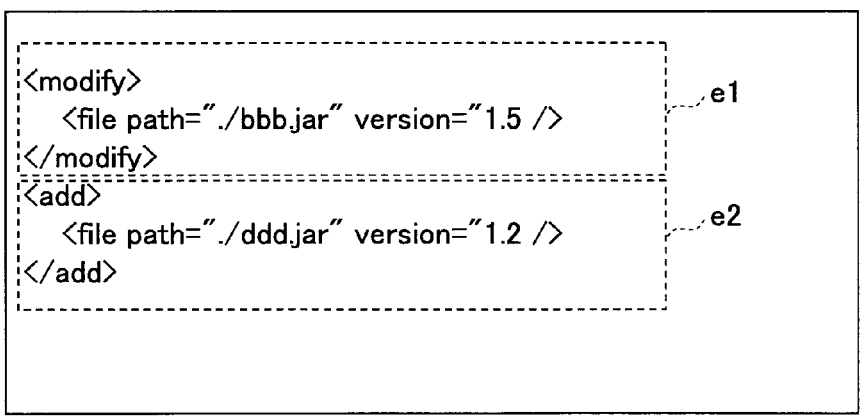
FIG. 11 illustrates an example of a configuration of a reboot necessity information storage unit.
FIG. 12 illustrates an example of difference component information.

FIG. 11 illustrates an example of a configuration of the reboot necessity information storage unit 15. As illustrated in FIG. 11, the reboot necessity information storage unit 15 stores values of "1" or "0" indicating whether reboot of the image forming apparatus 20 is necessary when updating from an immediately preceding version, for the respective versions of all program components (product IDs) managed by the program management server 10. "1" indicates that reboot is necessary, while "0" indicates that reboot is unnecessary. Hereinafter, the value of "1" or "0" indicating whether reboot is necessary is referred to as a "reboot necessity value".

For example, as to "aaa.jar", "0" is recorded for version 1.1, and "1" is recorded for version 1.2. This means that reboot is unnecessary when updating from version 1.0 to version 1.1, but reboot is necessary when updating from version 1.1 to version 1.2.

The value of "1" or "0" for the initial version ("1.0" in FIG. 11) indicates the necessity of reboot when the program component is initially installed.

The determining unit 13 determines the necessity of reboot by applying the difference information (FIG. 10) to the information (reboot necessity information) recorded in the reboot necessity information storage unit 15, for each difference component. Specifically, as for "bbb.jar", the version is updated from 1.2 to 1.5. Therefore, the determining unit 13 calculates the logical sum of the reboot necessity values relevant to the difference between version 1.2 and version 1.5. Specifically, "1" is obtained as the logical sum of the reboot necessity values "1", "1", and "0" of version 1.2, version 1.4, and version 1.5, respectively. Furthermore, as for the reboot necessity information of "ddd.jar", the determining unit 13 calculates the logical sum of the reboot necessity values up to version 1.2. Specifically, "1" is obtained as the logical sum of the reboot necessity values "1", "0", and "0" of version 1.0, version 1.1, and version 1.2, respectively.

The logical sum calculated for each difference component is information indicating whether it is necessary to reboot the image forming apparatus 20 according to the update of the corresponding difference component. That is to say, with the reboot necessity information (FIG. 11) according to the present embodiment, it is possible to determine whether reboot is necessary not only when updating from the immediately preceding version, but also when updating across plural versions.

In FIG. 11, the information relevant to all program components are managed in a single table; however, in another example, separate tables may be formed for the respective program components (i.e., for the respective rows indicated FIG. 11). Particularly, when the program components have different version systems, the reboot necessity information is preferably managed in units of program components.

Furthermore, the program management server 10 may manage whether reboot is necessary when updating from a past version, for the respective versions of the program components. For example, the program management server 10 may manage whether reboot is necessary when a program component is to be updated (upgraded) to version 1.4 from the respective versions of 1.2, 1.1, and 1.0. However, in this case, a large amount of information may be required. Furthermore, the update contents according to upgrade processes tend to be accumulative. Therefore, assuming that the program management server 10 manages the necessity of reboot when updating from an immediately preceding version as illustrated in FIG. 11, and a program module is to be updated over a plurality of versions, the necessity of reboot can be efficiently determined by calculating the logic sum of reboot necessity values of versions lying between the original version and the new version to which the program module is to be updated.

Next, the determining unit 13 calculates the logic sum of all logic sums calculated for the difference components, to determine whether reboot is necessary when updating the application 221*a* (step S124). Specifically, "1" is calculated as the logic sum of "1" for bbb.jar and "1" for ddd.jar. When the logic sum is "1", the determining unit 13 determines that the image forming apparatus 20 needs to be rebooted. When the logic sum is "0", the determining unit 13 determines that the image forming apparatus 20 does not need to be rebooted. That is to say, if at least one difference component needs to be rebooted, the determining unit 13 determines that the image forming apparatus 20 needs to be rebooted.

Next, the responding unit 14 returns, to the update control unit 223, a response including the determination result of the determining unit 13 (see FIG. 7) and the application 221*a* (step S125). The response may also include information indicating difference components (difference component information), as illustrated in FIG. 12.

FIG. 12 illustrates an example of difference component information. FIG. 12 illustrates an example where the difference component information is expressed in the XML format.

An element e1 located in a <modify> tag indicates information relevant to the difference component that is the update target. That is to say, this information is relevant to a difference component that is already installed in the image forming apparatus 20 but is subject to version update. In the present embodiment, "bbb.jar" corresponds to such a difference component.

Meanwhile, an element e2 located between an <add> tag indicates information relevant to a program component that is to be newly added. That is to say, this information is relevant to a difference component that is not installed in the image forming apparatus 20. In the present embodiment, "ddd.jar" corresponds to such a difference component.

When the process performed by the image forming apparatus 20 is the same in both cases of updating a program and newly adding a program, the updating process and the adding process do not need to be distinguished from one another, and may be collectively referred to as an update process (a program that is to be updated and a program that is to be installed may be collectively referred to as an "install target").

The application 221 of the new version may have less program components than the application 221 of the old version. In this case, the difference components to be deleted are extracted by the difference extracting unit 12. The difference component to be deleted is reported as being a program component to be deleted to the image forming apparatus 20, by including information of the corresponding difference component in the element located in a <delete> tag.

When the update control unit 223 of the image forming apparatus 20 receives the difference component information indicated in FIG. 12 together with the application 221a, the update target is limited to the difference components when updating the application 221a. That is to say, the update control unit 223 does not execute the update process (install process) for all program components included in the application 221a. Rather, the update control unit 223 executes the update process only for the differences between the application 221a and the components presently installed in the image forming apparatus 20. Therefore, the efficiency of the update process is enhanced.

The responding unit 14 of the program management server 10 may extract difference components from the application 221a, and return only the difference components to the update control unit 223, instead of returning the application 221a without modification. When only the difference components are returned, the difference component information of FIG. 12 is not mandatory. This is because the contents returned to the update control unit 223 are already limited to the differences, and therefore, the image forming apparatus 20 does not need to determine what the differences are.

As described above, according to the first embodiment, when updating the program, the program management server 10 dynamically determines whether it is necessary to reboot the image forming apparatus 20, based on the difference between the present status of the image forming apparatus 20 and the status of the image forming apparatus 20 after the update. Accordingly, the frequency of rebooting the image forming apparatus 20 can be reduced compared to the case of rebooting the image forming apparatus 20 every time an application 221 is updated. Consequently, the availability factor of the image forming apparatus 20 can be increased, thereby enhancing convenience for the user.

Next, a description is given of a second embodiment of the present invention. Only the points that are different between the first and second embodiments are described below.

Figure 13:
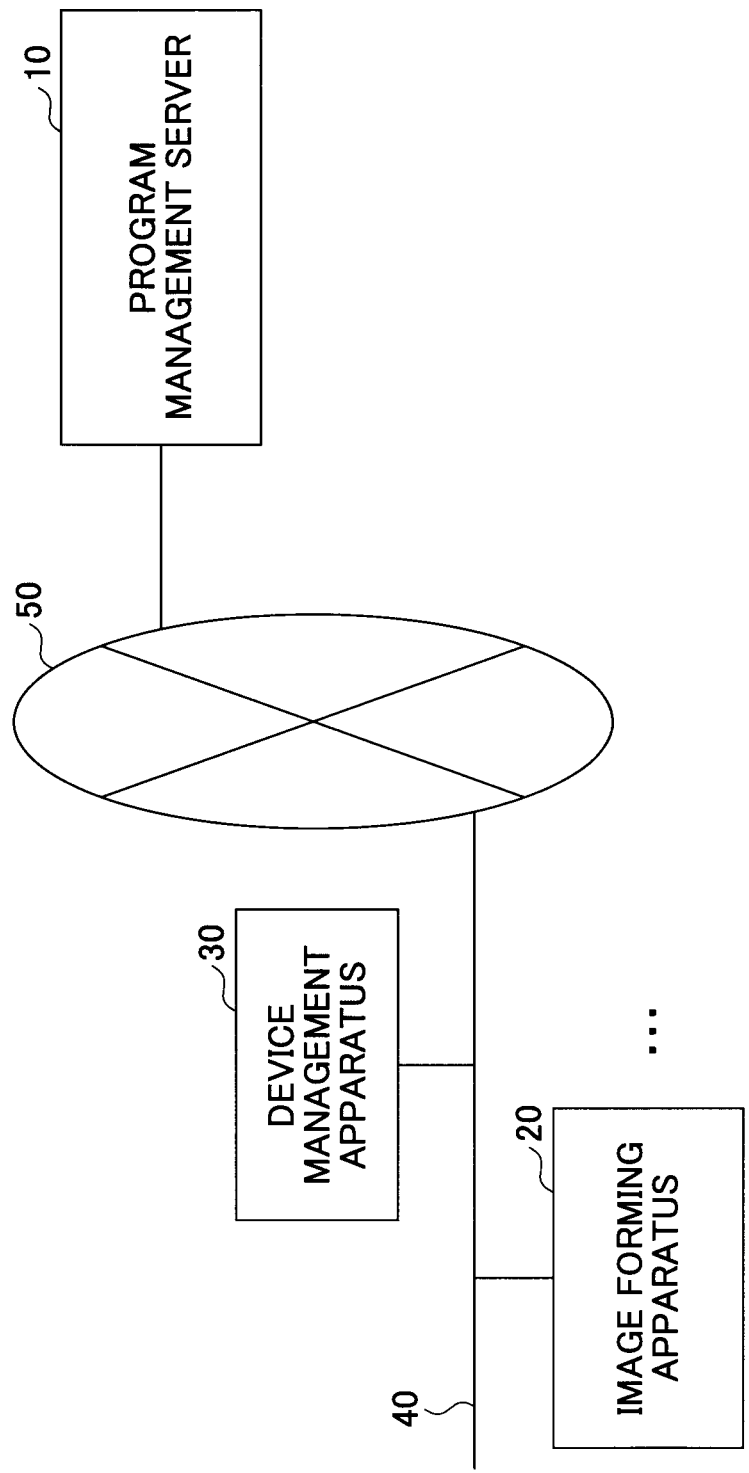
FIG. 13 illustrates an example of a system configuration according to a second embodiment of the present invention.

FIG. 13 illustrates an example of a system configuration according to the second embodiment. In FIG. 13, elements corresponding to those of FIG. 1 are denoted by the same reference numerals, and are not further described.

In FIG. 13, a device management apparatus 30 is connected to one or more image forming apparatuses 20 via a network 40 (wired or wireless) such as LAN. The device management apparatus 30 is connected to the program management server 10 via the network 50, in a manner that communications can be performed. Meanwhile, the image forming apparatus 20 may be hidden from the network 50. Therefore, the second embodiment is appropriate for a case where a user desires not to directly expose the image forming apparatus 20 to the Internet, etc.

The device management apparatus 30 is a computer for mediating the image forming apparatus 20 and the program management server 10, regarding the process of updating the application 221 in the image forming apparatus 20. Furthermore, the device management apparatus 30 is operated by the user for the update process according to the second embodiment.

Figure 14:
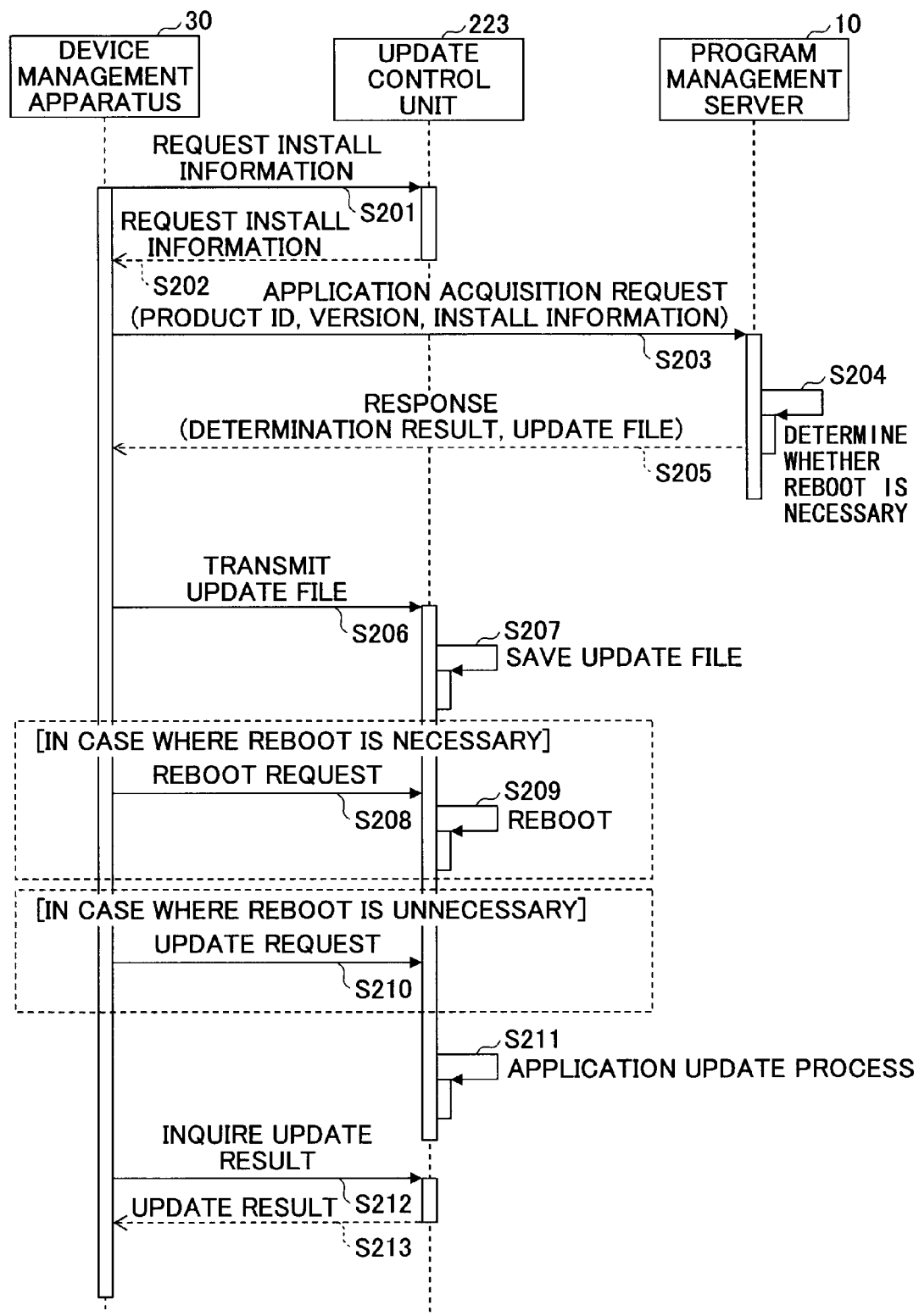
FIG. 14 is a sequence diagram for describing the processing procedures of a process for updating an application in the image forming apparatus according to the second embodiment of the present invention.

The following describes processing procedures according to the second embodiment. FIG. 14 is a sequence diagram for describing the processing procedures of a process for updating an application 221 in the image forming apparatus 20 according to the second embodiment of the present invention.

When the image forming apparatus 20 to be updated is selected according to an operation instruction input to the device management apparatus 30, the device management apparatus 30 requests the selected image forming apparatus 20 to transmit install information (step S201). The update control unit 223 of the image forming apparatus 20 acquires install information from the install information storage unit 224, and returns the install information to the device management apparatus 30 (step S202).

Next, the device management apparatus 30 specifies the product ID and version information of the application 221 that is input by the user, and the install information acquired from the image forming apparatus 20, and transmits a request to acquire the application 221 to the program management server 10 (step S203).

The acquisition request is received by the request receiving unit 11 of the program management server 10. The program management server 10 determines whether the image forming apparatus 20 needs to be rebooted, when the application 221 specified as an acquisition target in the acquisition request is updated (installed) in the image forming apparatus 20 (step S204). The process contents of step S204 may the same as those described with reference to FIG. 8. Next, the responding unit 14 of the program management server 10 returns, to the device management apparatus 30, the update file including the application 221 specified as the acquisition target and the determination result of whether reboot is necessary (step S205).

Next, the device management apparatus 30 transmits the update file to the image forming apparatus 20 (step S206). The update control unit 223 of the image forming apparatus 20 saves the received update file in the update file temporary storage unit 225 (step S207).

Next, the device management apparatus 30 determines whether to update the image forming apparatus 20 based on the determination result indicating whether reboot is necessary included in the response from the program management server 10. When the determination result indicates that reboot is necessary, the device management apparatus 30 causes a display unit of the device management apparatus 30 to display a reboot confirmation screen image. When the user selects to reject reboot in the reboot confirmation screen image, the device management apparatus 30 ends the process of FIG. 14. That is to say, in this case, neither the process of rebooting the image forming apparatus 20 nor the process of updating the application 221 is executed. Therefore, the user continues using the not-updated version of the application 221 corresponding to the update target.

When the user selects to allow reboot in the reboot confirmation screen page, the device management apparatus 30 requests the image forming apparatus 20 to execute reboot (step S208). In response to a request to execute reboot, the update control unit 223 causes the image forming apparatus 20 to reboot (step S209). In the process of rebooting the image forming apparatus 20, the update control unit 223 confirms whether an update file is saved in the update file temporary storage unit 225. When an update file is saved, the update control unit 223 executes an update process on the application 221 included in the update file (step S211).

Meanwhile, when the determination result included in the response from the program management server 10 indicates that reboot is unnecessary, the device management apparatus 30 transmits an update request to the image forming apparatus 20 instead of a reboot request, without displaying a reboot confirmation screen image (step S210). However, a reboot confirmation screen image may be displayed on the display unit of the device management apparatus 30. In the reboot confirmation screen image, when the user selects to allow the start of an update process, the device management apparatus 30 immediately transmits an update request. In the reboot confirmation screen image, when the user selects to reject the start of an update process, the device management apparatus 30 ends the process of FIG. 14 without transmitting an update request.

When a predetermined amount of time passes after transmitting a reboot request or an update request, the device management apparatus 30 inquires the image forming apparatus 20 of the result of the update process (step S212). The update control unit 223 of the image forming apparatus 20 returns the result of the update process (information indicating whether the update process is successful) to the device management apparatus 30 (step S213). The device management apparatus 30 causes the display unit to display the result of the update process.

As described above, even when the image forming apparatus 20 does not directly perform communications with the program management server 10, the same effects as those of the first embodiment can be achieved. That is to say, the target with which the program management server 10 communicates does not necessarily need to be the image forming apparatus 20 in which the application 221 is to be updated.

According to an embodiment of the present invention, the efficiency of processes for updating programs can be enhanced.

The present invention is not limited to the specific embodiments described herein, and variations and modifications may be made without departing from the scope of the present invention.

The present application is based on Japanese Priority Application No. 2010-182850 filed on Aug. 18, 2010 with the Japan Patent Office, the entire contents of which are hereby incorporated by reference.

The invention claimed is:

1. An information processing apparatus comprising:
a reboot necessity information storage memory unit configured to store reboot necessity information for each of multiple versions of at least one program that is an install target of an electronic device, the reboot necessity information for a version of the program indicating whether the electronic device needs to be rebooted when the program is updated to the version from an immediately-preceding version;
a difference extracting unit configured to extract difference information indicating a difference between a first version of the program installed in the electronic device and a second version of the program in response to a request to acquire the second version of the program;
a determining unit configured to determine whether the electronic device needs to be rebooted to update the first version of the program to the second version of the program based on the difference information and the reboot necessity information; and
a responding unit configured to return a determination result obtained by the determining unit,
wherein the determining unit determines that the electronic device needs to be rebooted when the reboot necessity information indicating that reboot is necessary is stored in the reboot necessity information storage memory unit for at least one version of the program indicated by the difference information.

2. The information processing apparatus according to claim 1, wherein
each of the first version of the program and the second version of the program includes a plurality of program components;
the reboot necessity information storage memory unit stores the reboot necessity information for each of multiple versions of each of the program components, the reboot necessity information for a version of a program component indicating whether the electronic device needs to be rebooted when the program component is updated to the version from an immediately-preceding version;
the difference extracting unit extracts the difference information indicating differences between the program components of the first version of the program and the program components of the second version of the program; and
the determining unit determines that the electronic device needs to be rebooted to update the first version of the program to the second version of the program when it is determined, based on the difference information and the reboot necessity information, that at least one of the program components of the second version of the program requires the electronic device to be rebooted.

3. The information processing apparatus according to claim 1, wherein
the responding unit returns the determination result and information relevant to the second version of the program indicated in the difference information.

4. A non-transitory computer-readable storage medium with an executable program stored therein, wherein the program instructs a processor of a computer to execute a method comprising:
extracting difference information indicating a difference between a first version of a program installed in an electronic device and a second version of the program in response to a request to acquire the second version of the program;
determining whether the electronic device needs to be rebooted to update the first version of the program to the second version of the program based on the difference information and reboot necessity information stored in a reboot necessity information storage memory unit for each of multiple versions of the program, the reboot necessity information for a version of the program indicating whether the electronic device needs to be rebooted when the program is updated to the version from an immediately-preceding version; and returning a determination result obtained at the determining, wherein in the determining, it is determined that the electronic device needs to be rebooted when the reboot necessity information indicating that reboot is necessary is stored in the reboot necessity information storage memory unit for at least one version of the program indicated by the difference information.

5. The non-transitory computer-readable storage medium according to claim 4, wherein each of the first version of the program and the second version of the program includes a plurality of program components;

the reboot necessity information is stored in the reboot necessity information storage memory unit for each of multiple versions of each of the program components, the reboot necessity information for a version of a program component indicating whether the electronic device needs to be rebooted when the program component is updated to the version from an immediately-preceding version;

the extracting includes extracting the difference information indicating the differences between the program components of the first version of the program and the program components of the second version of the program; and the determining includes determining that the electronic device needs to be rebooted to update the first version of the program to the second version of the program when it is determined, based on the difference information and the reboot necessity information, that at least one of the program components of the second version of the program requires the electronic device to be rebooted.

6. The non-transitory computer-readable storage medium according to claim 4, wherein the returning includes returning the determination result and information relevant to the second version of the program indicated in the difference information.

7. An update process support system comprising:

an information processing apparatus including a reboot necessity information storage memory unit configured to store reboot necessity information for each of multiple versions of at least one program that is an install target of an electronic device, the reboot necessity information for a version of the program indicating whether the electronic device needs to be rebooted when the program is updated to the version from an immediately-preceding version, a difference extracting unit configured to extract difference information indicating a difference between a first version of the program installed in the electronic device and a second version of the program in response to a request to acquire the second version of the program, a determining unit configured to determine whether the electronic device needs to be rebooted to update the first version of the program to the second version of the program based on the difference information and the reboot necessity information, and a responding unit configured to return a determination result obtained by the determining unit, the update process support system further comprising an update control unit configured not to reboot the electronic device after the first version of the program is updated to the second version of the program, when the determination result returned from the information processing apparatus does not request the electronic device to be rebooted, wherein the determining unit determines that the electronic device needs to be rebooted when the reboot necessity information indicating that reboot is necessary is stored in the reboot necessity information storage memory unit for at least one version of the program indicated by the difference information.

8. The update process support system according to claim 7, wherein each of the first version of the program and the second version of the program includes a plurality of program components;

the reboot necessity information storage memory unit stores the reboot necessity information for each of multiple versions of each of the program components, the reboot necessity information for a version of a program component indicating whether the electronic device needs to be rebooted when the program component is updated to the version from an immediately-preceding version;

the difference extracting unit extracts the difference information indicating differences between the program components of the first version of the program and the program components of the second version of the program; and the determining unit determines that the electronic device needs to be rebooted to update the first version of the program to the second version of the program when it is determined, based on the difference information and the reboot necessity information, that at least one of the program components of the second version of the program requires the electronic device to be rebooted.

* * * * *